(12) United States Patent
Bates

(10) Patent No.: US 10,239,137 B1
(45) Date of Patent: Mar. 26, 2019

(54) RECIPROCATING SAW BLADE FOR PREPARING FISH

(71) Applicant: FilletZall Holdings, LLC, Kemah, TX (US)

(72) Inventor: Paul Bates, Kemah, TX (US)

(73) Assignee: FilletZall Holdings, LLC, Kemah, TX (US)

( * ) Notice: Subject to any disclaimer, the term of this patent is extended or adjusted under 35 U.S.C. 154(b) by 0 days.

(21) Appl. No.: 15/803,854

(22) Filed: Nov. 6, 2017

(51) Int. Cl.
　　*B23D 61/00* (2006.01)
　　*B23D 61/12* (2006.01)
　　*A22C 25/16* (2006.01)
　　*B23D 51/10* (2006.01)

(52) U.S. Cl.
　　CPC ............ *B23D 61/121* (2013.01); *A22C 25/16* (2013.01); *B23D 51/10* (2013.01); *B23D 61/123* (2013.01)

(58) Field of Classification Search
　　CPC ................................. A22C 25/00; B23D 61/00
　　USPC .......................................... 452/149, 102–105
　　See application file for complete search history.

(56) References Cited

U.S. PATENT DOCUMENTS

| | | | | |
|---|---|---|---|---|
| 3,307,259 A | * | 3/1967 | Christensen | B26B 7/005 279/23.1 |
| 4,711,030 A | * | 12/1987 | Ruston, Sr. | B26B 7/005 30/277.4 |
| 6,434,836 B1 | * | 8/2002 | Olivares | B26B 7/00 30/125 |
| 6,487,779 B1 | * | 12/2002 | Underthun | B26B 7/005 30/277.4 |
| D508,389 S | * | 8/2005 | Polk | B23D 49/11 D7/646 |
| 7,536,793 B1 | * | 5/2009 | Richmond | A47G 21/14 211/70.7 |
| 8,689,667 B2 | * | 4/2014 | Butzen | B23D 61/121 30/355 |
| 8,707,564 B2 | * | 4/2014 | Burch | B23D 51/01 30/155 |

* cited by examiner

*Primary Examiner* — Richard T Price, Jr.
(74) *Attorney, Agent, or Firm* — Spradley PLLC; Michael Spradley

(57) ABSTRACT

This disclosure relates to a reciprocating saw blade for preparing fish. The reciprocating saw blade can comprise a blade and a wing. The blade can attach to a reciprocating blade. The blade can comprise a tip, a cutting edge, a spine, and a heel. The cutting edge can have continuous wavy serrations formed through a tooth from a plurality of teeth. The tip can form an inward curve towards the cutting edge. The cutting edge can be at one side of the blade while the spine can be at the opposite side. The spine can form an equidistant parallel line with the cutting edge. The heel can be at the rear end of the cutting edge. The wing can be at the rear end of the blade and can have an orifice and a prong. The orifice can be compatible to a quick-release mechanism of the reciprocating blade.

8 Claims, 5 Drawing Sheets

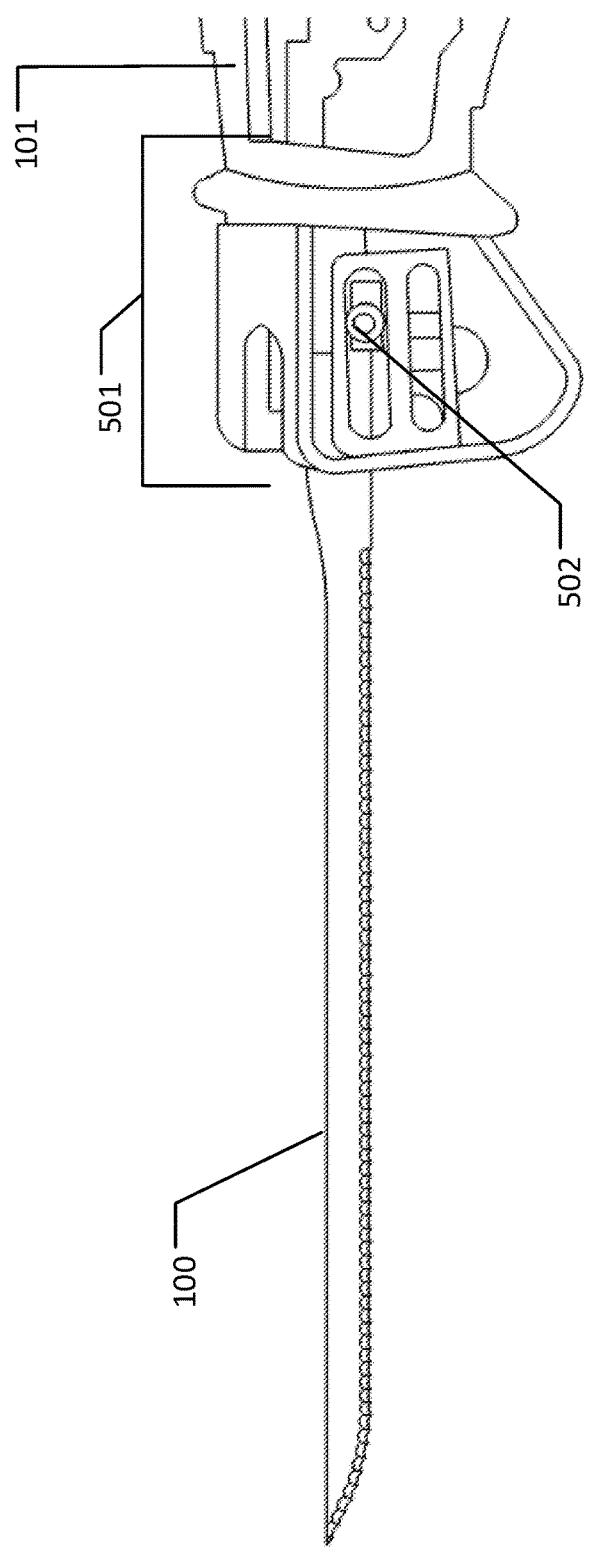

RECIPROCATING SAW BLADE FOR PREPARING FISH

BACKGROUND

This disclosure relates to a reciprocating saw blade for preparing fish.

Traditionally, preparing fish can be done using a standard fillet knife. Standard fillet knives can allow better control when filleting a fish as the blade can slide easily through fish meat. However, such method can only be effective when used for preparing minimal portion of fish. Such method can be time-consuming, tiresome, and repetitive when preparing a large portion of fish. An unconventional but fast and effective way of filleting a fish is through using a reciprocating saw. Reciprocating saw is a type of machine-powered saw that can be used in cutting different objects and/or material. In this method, a standard reciprocating saw blade can be attached to reciprocating saw in order to cut fish meat. Currently, there are limited types of reciprocating saw blades that are out in the market. Moreover, there are different species of fish, such as crappie, catfish, trout, and weakfish, which needs a particular blade design to effectively fillet and prepare fish meat. As such, it would be useful to have an improved system and method for a reciprocating saw blade for preparing fish.

SUMMARY

This disclosure relates to a reciprocating saw blade for preparing fish. The reciprocating saw blade can comprise a blade and a wing. The blade can attach to a reciprocating blade. The blade can comprise a tip, a cutting edge, a spine, and a heel. The cutting edge can have continuous wavy serrations formed through a tooth from a plurality of teeth. The tip can form an inward curve towards the cutting edge, further wherein the cutting edge can be at one side of the blade. The spine can be at the opposite side of the cutting edge, wherein the spine can form an equidistant parallel line with the cutting edge. The heel can be at the rear end of the cutting edge. The wing can be at the rear end of the blade and can have an orifice and a prong. The orifice can be compatible to a quick-release mechanism of the reciprocating blade.

BRIEF DESCRIPTION OF THE DRAWINGS

FIG. 5 illustrates how a blade can be attached to a reciprocating saw.

DETAILED DESCRIPTION

Described herein is a system and method for a reciprocating saw blade for preparing fish. The following description is presented to enable any person skilled in the art to make and use the invention as claimed and is provided in the context of the particular examples discussed below, variations of which will be readily apparent to those skilled in the art. In the interest of clarity, not all features of an actual implementation are described in this specification. It will be appreciated that in the development of any such actual implementation (as in any development project), design decisions must be made to achieve the designers' specific goals (e.g., compliance with system- and business-related constraints), and that these goals will vary from one implementation to another. It will also be appreciated that such development effort might be complex and time-consuming, but would nevertheless be a routine undertaking for those of ordinary skill in the field of the appropriate art having the benefit of this disclosure. Accordingly, the claims appended hereto are not intended to be limited by the disclosed embodiments, but are to be accorded their widest scope consistent with the principles and features disclosed herein.

Figure 1:
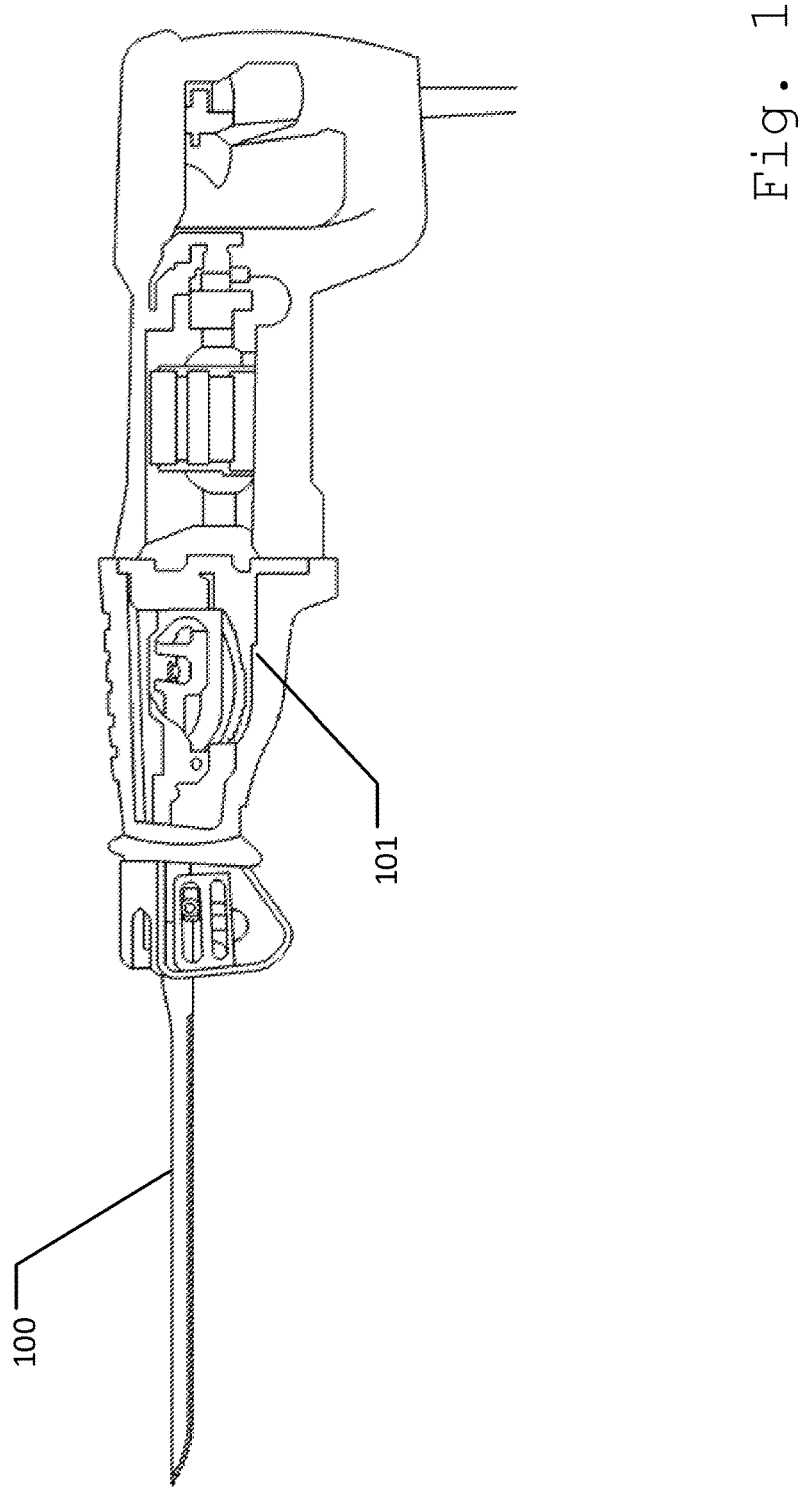
FIG. 1 illustrates a blade attached to a reciprocating saw.

FIG. 1 illustrates a blade 100 attached to a reciprocating saw 101. Blade 100 can be a tool connectable to a portion of reciprocating saw 101. Blade 100 can be made of any durable material that can include but is not limited to carbon steel, stainless steel, and ceramic. Blade 100 can vary in length, and/or size. Blade 100 can be used to clean species of fish such as crappie, catfish, trout, and weakfish. Reciprocating saw 101 can be any type of saw that uses a push and pull reciprocating motion of blade 100 to cut meat. An example of reciprocating saw 101 can be a Sawzall.

Figure 2:
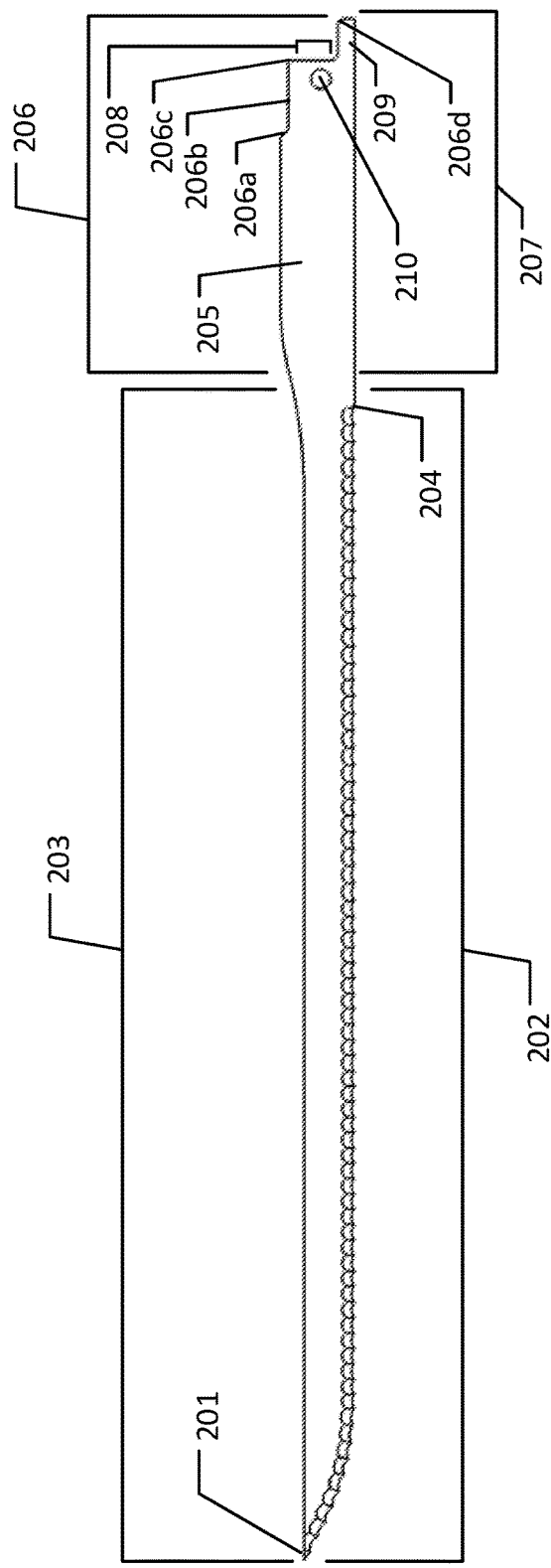
FIG. 2 illustrates a side view of a blade.

FIG. 2 illustrates a side view of blade 100. FIG. 2 illustrates a side view of blade 100. The main parts of blade 100 can comprise a tip 201, a cutting edge 202, a spine 203, a heel 204 and a wing 205. Tip 201 can be the pointed portion of blade 100, which connects cutting edge 202 and spine 203. Tip 201 can form convex curve towards cutting edge 202. Cutting edge 202 can extend from tip 201 to heel 204. Cutting edge 202 can be one side of blade 100 that is capable of cutting meat. Spine 203 can be the other side of blade 100, which can be at the opposite side of cutting edge 202. Spine 203 and cutting edge 202 can form a parallel line that is equidistant to each other. Furthermore, the rear portion of spine 203 can incline upwards towards the starting point of first wing edge 206, then forms a straight line towards slope 206a. Heel 204 can be the end point of cutting edge 202 and the starting point of wing 205. Starting from heel 204, wing 205 can be the portion of blade 100 that extends outward. Moreover, wing 205 can be the portion of blade 100 that connects to reciprocating saw 101. Wing 205 can comprise a first wing edge 206, and a second wing edge 207. First wing edge 206 can be the edge that connects at the rear end of spine 203 while second wing edge 207 can be the edge portion of wing 205 that connects to heel 204 on cutting edge 202. First wing edge 206 can comprise a slope 206a, a straight edge 206b, a first sink point 206c and a second sink point 206d. Slope 206a can be a slightly downward slope at the middle portion of wing 205. Straight edge 206b can start at the end point of slope 206a and can end at first sink point 206c. First sink point 206c and second sink point 206d can be the starting point wherein a slight drop that is perpendicular to first wing edge 206 is formed. From the end point of first sink point 206c first wing edge 206 can continuously form a straight line, which can be parallel with second sink point 206d, up to second sink point 206d. A perpendicular straight line 208 can be formed from second sink point 206b. The rear end of second wing edge 207 can form a prong 209 that extends outward of wing 205. Perpendicular straight line 208 can connect prong 209 with second sink point 206b. Second wing edge 207 can be a straight line that starts from heel 204 and ends at the tip of prong 209. Furthermore, second wing edge 207 can form an equidistant parallel line with straight edge 206b. The side surface of wing 205 can comprise an orifice 210 placed near the rear edge of wing 205. Orifice 210 can be a through-and-through hole placed on the side surface of wing 205, near perpendicular straight line 208.

Figure 3:
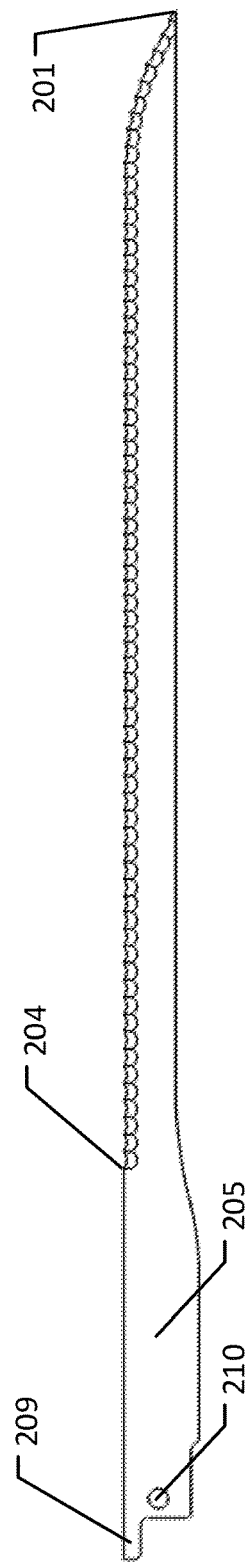
FIG. 3 illustrates an embodiment of a blade.

FIG. 3 illustrates an embodiment of blade 100. As a non-limiting example, the length of blade 100, which can be from tip 201 to the rear end of prong 209 can be 11⅜ inches. In another non-limiting example, the length from tip 201 to heel 204 can be 8½ inches, while the length from heel 204 to the rear end of prong 209 can be 2⅞ inches. In another embodiment, length from tip 201 to heel 204 can be 6½ inches. As another non-limiting example, the width of wing 205 from first wing edge 206 up to second wing edge 207 can be 9/16". Further as another non-limiting example, the width of blade 100 from the tip of a tooth of cutting edge 202 to spine 203 can be ⅜". As another non-limiting example, the diameter of orifice 210 can be 0.1406 inches.

Figure 4:
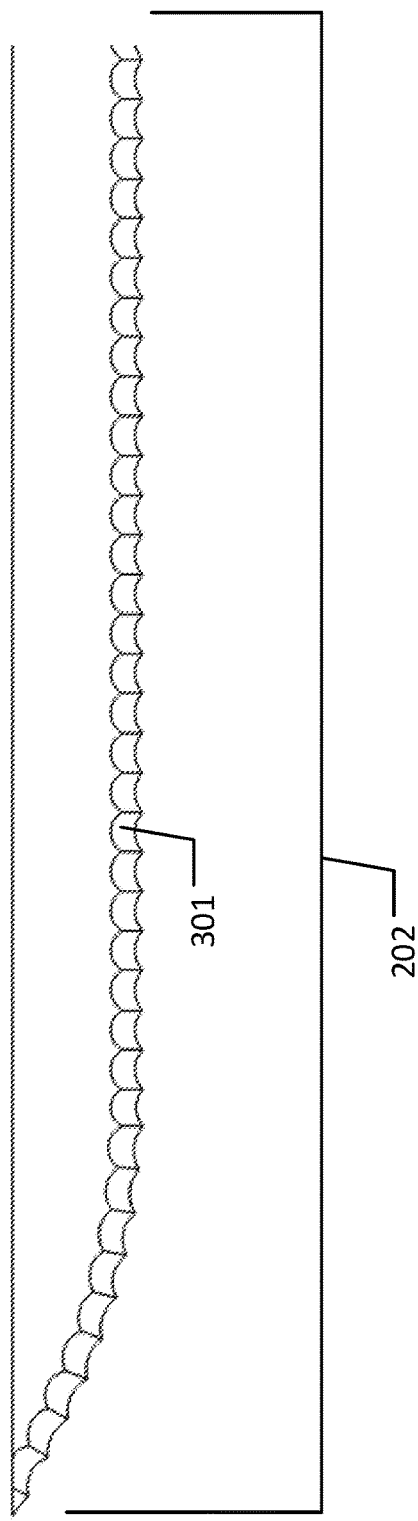
FIG. 4 illustrates a cutting edge comprising a plurality of teeth.

FIG. 4 illustrates cutting edge 202 comprising a plurality of teeth 301. Cutting edge 202 can have a continuous wavy serration formed through teeth 301. In such embodiment, cutting edge 202 can allow greater pressure to be exerted on fish meat.

FIG. 5 illustrates how blade 100 can be attached to reciprocating saw 101. Some of the main components of reciprocating saw 101 can include but is not limited to a shoe 501, and a quick-release mechanism 502. As an example embodiment, quick-release mechanism 502 on reciprocating saw 101 can comprise a pin 503, which can be mateable with orifice 210 of blade 100. Blade 100 can attach to reciprocating saw 101 by inserting blade 100 into the slot on shoe 501. Once inserted, orifice 210 on blade 100 can be connected with quick-release mechanism 502.

Various changes in the details of the illustrated operational methods are possible without departing from the scope of the following claims. Some embodiments may combine the activities described herein as being separate steps. Similarly, one or more of the described steps may be omitted, depending upon the specific operational environment the method is being implemented in. It is to be understood that the above description is intended to be illustrative, and not restrictive. For example, the above-described embodiments may be used in combination with each other. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein."

What is claimed is:

1. A reciprocating saw blade for preparing fish comprising a blade attachable to a reciprocating blade, wherein said blade comprising
    a tip;
    a cutting edge having continuous wavy serrations formed through a tooth from a plurality of teeth, said tip forms an inward curve towards said cutting edge, further wherein said cutting edge at one side of said blade,
    a spine at the opposite side of said cutting edge, wherein said spine forms an equidistant parallel line with said cutting edge;
    a heel at the rear end of said cutting edge; and
    a wing at the rear end of said blade having an orifice and a prong, said orifice compatible to a quick-release mechanism of said reciprocating blade.

2. The reciprocating saw blade of claim 1 wherein the ratio of the length from said tip to said prong to the length of said wing is 1:0.75.

3. The reciprocating saw blade of claim 1 wherein said tip forms a convex curve towards said cutting edge.

4. The reciprocating saw blade of claim 1 wherein said wings further comprise
    an orifice;
    a first wing edge that connects at the rear end of said spine, said first wing edge having
        a slope;
        a straight edge that starts at the end point of said slope, wherein said slope inclines upward from said heel towards said straight edge;
        a first sink point that forms a slight drop from said straight edge, wherein said first wing edge forms a straight line from the end of said first sink point; and
        a second sink point, wherein said first wing edge forms a perpendicular straight line towards said prong, further wherein said orifice placed near said perpendicular straight line; and
    a second wing edge that connects to said heel of said cutting edge.

5. The reciprocating saw blade of claim 3 wherein the rear portion of said spine can incline upwards towards the starting point of said first wing edge.

6. The reciprocating saw blade of claim 3 wherein the diameter of said orifice is 0.1406 inches.

7. The reciprocating saw blade of claim 3 wherein said second wing edge forms an equidistant parallel line with said straight edge.

8. The reciprocating saw blade of claim 3 wherein the ratio of the width from said cutting edge to said spine to the width of said straight edge to said second wing edge is 1:0.67.

* * * * *